(12) United States Patent
Gradu

(10) Patent No.: US 7,243,768 B2
(45) Date of Patent: Jul. 17, 2007

(54) CLUTCH HAVING A VARIABLE VISCOSITY FLUID

(75) Inventor: Mircea Gradu, Massillon, OH (US)

(73) Assignee: The Timken Company, Canton, OH (US)

( * ) Notice: Subject to any disclaimer, the term of this patent is extended or adjusted under 35 U.S.C. 154(b) by 218 days.

(21) Appl. No.: 10/529,992

(22) PCT Filed: Jan. 29, 2003

(86) PCT No.: PCT/US03/02655

§ 371 (c)(1),
(2), (4) Date: Mar. 31, 2005

(87) PCT Pub. No.: WO2004/033929

PCT Pub. Date: Apr. 22, 2004

(65) Prior Publication Data

US 2006/0016657 A1    Jan. 26, 2006

Related U.S. Application Data

(60) Provisional application No. 60/415,669, filed on Oct. 3, 2002.

(51) Int. Cl.
*F16D 35/02* (2006.01)
(52) U.S. Cl. ........................ 192/21.5; 192/60
(58) Field of Classification Search ................ 192/60
See application file for complete search history.

(56) References Cited

U.S. PATENT DOCUMENTS

| | | | | |
|---|---|---|---|---|
| 1,227,910 A | * | 5/1917 | Hubbard et al. ............... | 192/60 |
| 1,765,948 A | * | 6/1930 | Sheridan ....................... | 192/60 |
| 1,886,624 A | * | 11/1932 | Barton ......................... | 192/60 |
| 2,453,981 A | * | 11/1948 | Hickman ...................... | 192/60 |
| 3,577,803 A | * | 5/1971 | Mueller ........................ | 192/60 |
| 3,831,461 A | * | 8/1974 | Mueller ........................ | 192/60 |
| 5,518,095 A | | 5/1996 | Gassmann | |
| 5,598,911 A | | 2/1997 | Joachim et al. | |
| 5,984,066 A | * | 11/1999 | Kurisu ......................... | 192/60 |
| 5,988,336 A | * | 11/1999 | Wendt et al. .............. | 192/21.5 |
| 6,269,925 B1 | | 8/2001 | Brunken | |
| 6,857,364 B2 | * | 2/2005 | Gorbing et al. ............ | 192/21.5 |

* cited by examiner

*Primary Examiner*—Rodney H. Bonck
(74) *Attorney, Agent, or Firm*—Polster, Lieder, Woodruff & Lucchesi, L.C.

(57) ABSTRACT

A clutch (A,B) includes a cam (20,70) and a rotor (22,74), both of which revolve around a common axis (X). The cam has a camming surface (30,72) provided with lobes (32), whereas the rotor carries pistons (26,80) which bear against the camming surface of the cam. The pistons project from piston cavities (40,42; 76) in the rotor and those cavities communicate through a connecting cavity (44,78), to thereby form a fluid chamber (56,82) of constant volume which contains a magneto-rheological fluid (28,84). An electrical coil controls the viscosity of the rheological fluid. When the viscosity is low, the pistons will move inwardly and outwardly on the rotor as the camming surface passes over them and no torque will transfer between the cam and rotor. However, when the fluid is viscous, the fluid will impede displacement of the pistons in the piston cavities, and the pistons will grip the camming surface sufficiently to enable torque to transfer between the cam and rotor.

19 Claims, 2 Drawing Sheets

CLUTCH HAVING A VARIABLE VISCOSITY FLUID

RELATED APPLICATIONS

This application derives and claims priority from International Application PCT/2003/002655, filed Jan. 29, 2003, and published under International Publication Number WO 2004/03329 A1, and from U.S. Provisional Application 60/415,669 filed Oct. 3, 2002.

TECHNICAL FIELD

This invention relates in general to coupling devices for rotating machine components and more particularly to a clutch containing a variable viscosity fluid for controlling the transfer of torque between rotating machine components.

BACKGROUND ART

The typical clutch serves as a coupling between two machine components which at times must rotate in unison and at other times must be disconnected so that the one component may rotate while the other remains at rest. Of course, when the clutch is engaged and the two components rotate in unison, torque transfers from the driving component to the driven component. In most applications a clutch must engage gradually to avoid imparting mechanical shocks to the equipment of which it is a part.

Clutches come in a variety of designs and configurations and find widespread use in automotive and industrial equipment. A good clutch should have minimal drag torque, both when engaged and disengaged, should be relatively insensitive to centrifugal and centripetal forces, should be capable of engaging and disengaging at varying speeds and speed differentials, should transmit torque bidirectionally, that is in both directions of rotation, should have low backlash, should damp vibrations, and should protect against overload.

Many clutches of current manufacture require complex actuating mechanisms to engage and disengage them. These mechanisms increase the weight and size of such clutches, not to speak of complexity. Indeed, these clutches typically rely on complex linkages to operate them, and this adversely affects the responsiveness of the clutches and their capacity of to modulate the transfer of torque between rotating components.

SUMMARY OF THE INVENTION

The present invention resides in a clutch having a cam and a rotor which rotate about a common axis. The cam has a camming surface and the rotor carries pistons which contact the camming surface. Backing the pistons within the rotor is a rheological fluid, the viscosity of which is controlled by suitable means. When the viscosity is low the cam can rotate independently of the rotor, with the pistons simply following the camming surface. But when the viscosity is higher, the pistons tend to grip the camming surface and torque transfers between the cam and the rotor. The invention also resides in a process for transferring torque using a rheological fluid.

BEST MODE FOR CARRYING OUT THE INVENTION

Figure 1:
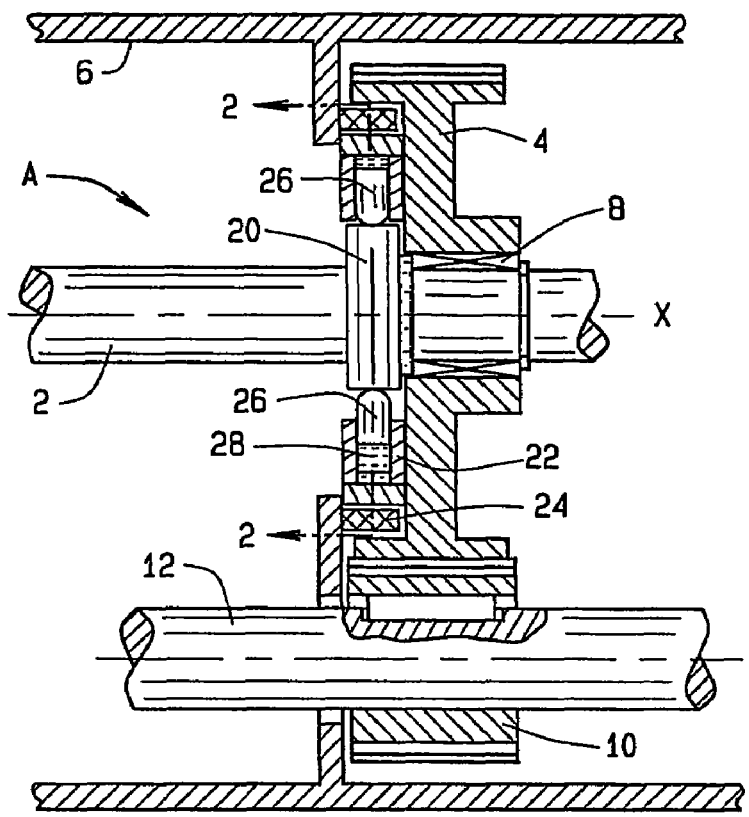
FIG. 1 is a sectional view a housing containing two shafts coupled with a clutch constructed in accordance with and embodying the present invention.

Referring now to the drawings, a clutch A (FIG. 1) couples two machine components which rotate, or at least have the capacity to rotate, about a common axis X. The components may take the form of a shaft 2 and a spur gear 4 supported on bearings in a housing 6. Actually the spur gear 4 rotates on a bearing 8 fitted to the shaft 2, and the gear 4 meshes with a pinion 10 that is fitted to another shaft 12 that may lie parallel to the shaft 2. The shaft 12 and its pinion 10 likewise rotate in the housing 6. Thus, in a broad sense the clutch A couples the two shafts 2 and 12 so that one rotates with the other and a torque transfers between the two. Moreover, the clutch A permits the shaft 2 and gear 4 to be selectively engaged with and disengaged from each other. Both engagement and disengagement occur smoothly so that the shafts 2 and 12 and the spur gear 4 and pinion 10 are not subjected to abrupt changes in torque which might damage them or other machine components to which they are connected.

Figure 2:
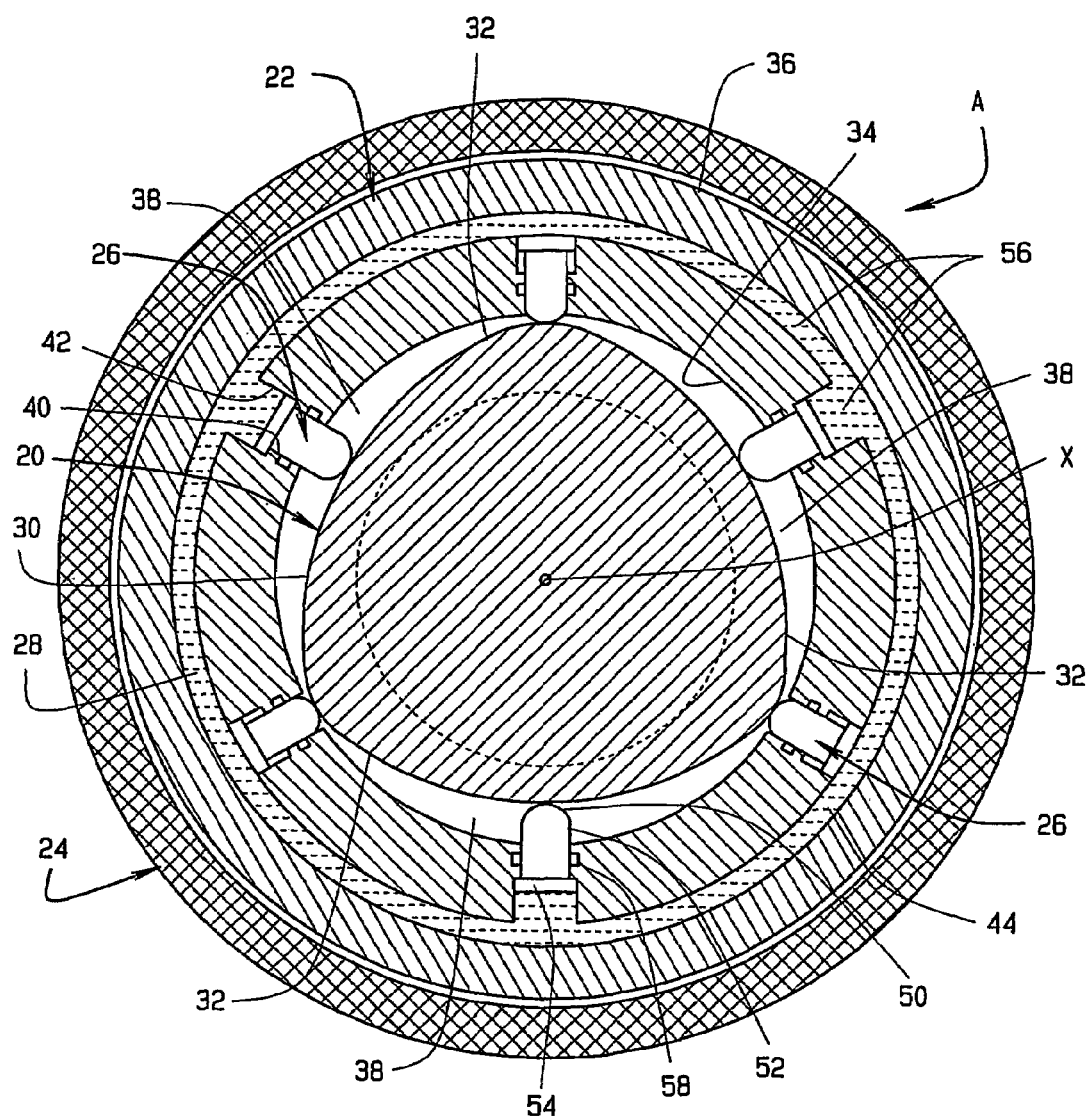
FIG. 2 is a sectional view of the clutch taken along line 2-2 of FIG. 1.

Turning now to the clutch A itself, it includes (FIG. 2) a cam 20, a rotor 22 which surrounds the cam 20, and a coil 24 which surrounds the rotor 22. All lie concentric around the axis X of rotation. In addition, the clutch A includes pistons 26 that are carried by the rotor 22 and operate against the cam 20 and a magneto-rheological fluid 28 which is contained within the rotor 22. The cam 20 is mounted on the shaft 2 with which it rotates, whereas the rotor 22 is attached to the spur gear 4 with which it rotates. The coil 26 is mounted in a fixed position on the housing 6. In a broad sense, the cam 20 constitutes one rotatable clutch member, whereas the rotor 22 constitutes another rotatable clutch member, each of which, when rotating, revolves, with its axis of rotation being the axis X.

The cam 20 fits firmly to the shaft 2 and may even be formed integral with the shaft 2. In any event, it rotates with the shaft 2, its rotation at all times being that of the shaft 2. The cam 20 along its periphery has a camming surface 30 that includes several lobes 32 that are arranged at equal circumferential intervals around the axis X. The camming surface 30 in transverse cross section may be flat or grooved. The several lobes 32 are identical in configuration, and each projects exactly the same distance from the axis X.

The rotor 22 is attached firmly to the spur gear 4, so that it rotates with the gear 4, its rotation being that of the gear 4. It has a cylindrical interior surface 34 and a cylindrical exterior surface 36 which are concentric and have their centerlines along the axis X. The diameter of the interior surface 34 exceeds the greatest diameter of the cam 20, which is at its lobes 32, but not by much. Thus, the cam 20 comes closest to the cylindrical interior surface at its lobes 32, and intermediate the lobes 32 arcuate gaps 38 exist between the camming surface 30 and the cylindrical interior surface 34. The rotor 22 contains several sets of bores 40 and counterbores 42, with the former opening out of the cylindrical interior surface 34 and the latter into a connecting cavity 44 that is enclosed by the rotor 22. As a consequence, all of the counterbores 42 are in communication through the connecting cavity 44. Each bore 40 and its counterbore 42 forms a piston cavity, and the piston cavities are arranged at equal circumferential intervals around the axis X. The rotor 22 preferably should contain at least twice as many piston cavities, that is to say sets of bores 40 and counterbores 42, as there are lobes 32 on the cam 20. In this arrangement, half of the bores 40, at some point during relative rotation between the cam 20 and rotor 22, will align with the lobes 32 on the cam 20, while the remaining bores 40 lie centered along the arcuate gaps 38.

The pistons 26 reside within the piston cavities formed by the bores 40 and counterbores 42 of the rotor 22, there being a single piston 26 in each combination bore 40 and counterbore 42. Each piston 26 possesses a semispherical inner end 50, a cylindrical side face 52, and optionally a flanged outer end 54. The semispherical inner end 50 bears against the camming surface 30 of the cam 20. Where the camming surface 30 is grooved, its transverse cross-sectional configuration should conform to the semispherical ends 50 of the pistons 26. The cylindrical surface side face 52 lies at least in part within the bore 40, whereas the flanged end 54 lies entirely within the larger counterbore 44. The region of each counterbores 42 behind the flanged end 54, which is the unoccupied region each counterbore 42, together with the connecting cavity 44 forms a fluid chamber 56 within the rotor 22. As long as the semispherical ends 50 of all the pistons 22 remain against the camming surface 30 of the cam 20 the volume of the fluid chamber 56 remains constant, even though the configuration of the fluid chamber 56 changes owing to relative rotation between the cam 20 and rotor 22. Along each of its bores 40 the rotor 22 is fitted with a seal 58 that wipes the cylindrical side face 52 of the piston 26 in that bore 40 to thereby establish a fluid barrier between the inside of the rotor 22, which is occupied by the cam 20, and the fluid chamber 56 within the rotor 22. Notwithstanding the seals 58, the pistons 26 may move toward and away from the axis X—and indeed they do when relative rotation occurs between the cam 20 and the rotor 22. At any time during this relative rotation, except when the pistons 26 are centered on the lobes 32 of the cam 20, half of the pistons 26 will be moving inwardly toward the axis X and the other half will be moving outwardly away from the axis X. The displacement of the inwardly moving pistons 26 equals the displacement of the outwardly moving pistons 26 in terms of volume, and as a consequence, the overall volume of the fluid chamber 56 does not change.

In lieu of having all of the piston cavities open into the common connecting cavity 44, the piston cavities may be organized into pairs, with the piston cavities of each pair being adjacent to each other and in communication through a connecting channel in the rotor 22. In effect, each connecting channels and the unoccupied regions of the piston cavities it connects form a fluid chamber of constant volume.

The seals 58 may be carried by the pistons 26, much as are the piston rings of internal combustion engines, and when so located would wipe the cylindrical surfaces of the bores 44. They may be made from an elastomer, such as Viton.

The magneto-reheological fluid 28 occupies the fluid chamber 56 in its entirety. No air or gas pockets to speak of exist within the chamber 56. In view of the rheological properties of the fluid 28, the capacity of the fluid 28 to flow, that is to say its viscosity, can be altered. Being magneto-rheological, the viscosity will change in response to a magnetic field or more accurately to variations in a magnetic field within which the fluid 28 exists. Indeed, using a magnetic field, one can vary the viscosity from roughly equivalent to that of water, to almost a solid—the stronger the field, the greater the viscocity.

The electrical coil 24 is mounted firmly on the housing 6 where it surrounds the rotor 22, and indeed lies quite close to the cylindrical exterior surface 36 of the rotor 22. It is connected to a source of electrical energy through a control device for varying the current that passes through it. That current creates a magnetic field, and the rotor 22 and the rheological fluid 28 within the rotor 22 lie within that magnetic field. The strength of the magnetic field determines the viscosity of the fluid in the fluid chamber 56 of the rotor 22.

In the operation of the clutch A, the shaft 2, which is connected to a motor of some type, rotates, and it turns the cam 20 that is mounted on it. Assuming that the coil 24 is de-energized, in which event the fluid 28 has low viscosity, and that the gear 4 and shaft 12 are subjected to a load and thus resist rotation, the camming surface 30 of the cam 20 moves over the semispherical ends 50 of the pistons 26, causing the pistons 26 to move inwardly and outwardly in their bores 40 and counterbores 42. More particularly, as the lobe 32 on a piston 26 approaches a bore 40 in the rotor 22, it drives the piston 26 in that bore 40 farther into the bore 40 and its counterbore 42, thereby forcing some of the rheological fluid 28 out of the counterbore 42. At the same time, the camming surface 30 moves away from another bore 40. In effect, the fluid 28 displaced from the counterbore 42 of diminishing volume flows into the counterbore 42 of increasing volume. After all, irrespective of the angular position of the cam 20 relative to the rotor 22, the volume of the fluid chamber 56 remains the same. Thus, when the cam 20 turns with the fluid 28 being at low viscosity and the rotor 22 impeded from rotating, the cam 20 simply revolves within the rotor 22, causing the pistons 26 in the rotor 22 to move inwardly and outwardly and the rheological fluid 28 to displace in the fluid chamber 56, but not otherwise disturbing the rotor 22. In short, the rotor 22 remains at rest.

However, when the coil 24 is energized, the rheological fluid 28 stiffens, that is to say, it becomes more viscous. Possessing less capacity to flow, the fluid 28 does not transfer as well in the counterbores 46 and connecting cavity 44 and the pistons 46 exhibit greater resistance to reciprocation in their bores 40 and counterbores 44. Indeed, those pistons 26 which experience a displacement into the rotor 22, that is to say, the ones that ride up the camming surface 30 toward a lobe 32, tend to grip the cam 30. As the current in the coil 24 increases the viscosity of the fluid in the chamber 56 becomes even greater. At some point the fluid 28 becomes viscous enough to enable the pistons 26 to grip the cam 30 at its surface 32 with enough force to overcome the resistance of the rotor 22 to rotation. At that point the cam 20 imparts rotation to rotor 22. As a consequence, the gear 4 turns and so does the shaft 12 which is connected to the gear 4 through the pinion 10. To be sure, the cam 20 still rotates within the rotor 22 and the pistons 26 move inwardly and outwardly, but with less frequency owing to the rotation of the rotor 22.

If enough current is conducted by the coil 24, the rheological fluid 28 for all intents and purposes almost solidifies. Under these conditions, the rotor 22 is locked to the cam 20 and rotates it the same angular velocity as the cam 20.

Figure 3:
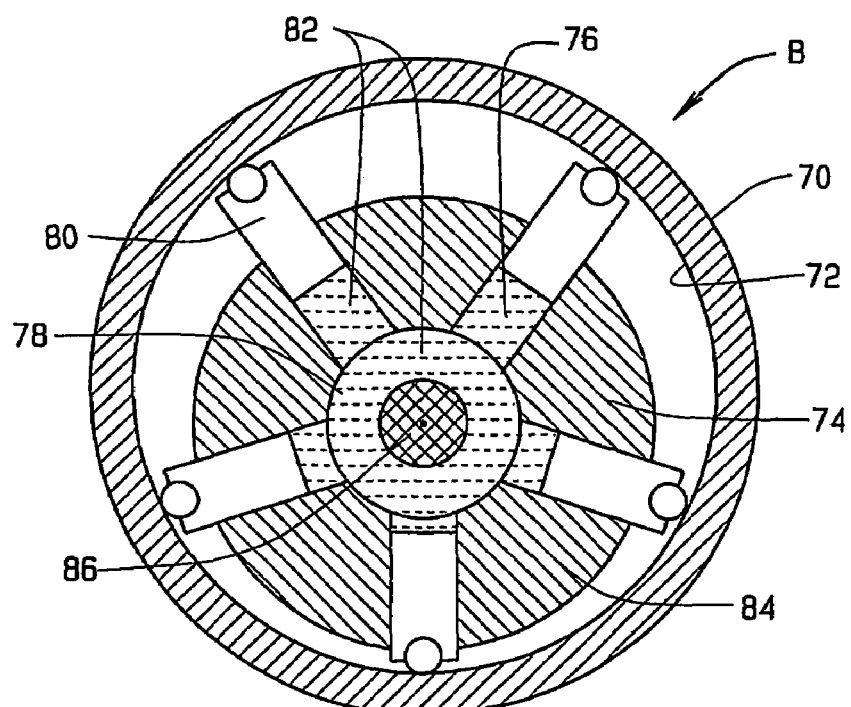
FIG. 3 is a sectional view of a modified clutch.

The camming surface need not be presented outwardly away from the axis X of rotation as in the clutch A, but instead may be presented inwardly toward axis X. Likewise, the cam need not have multiple lobes. In this regard, a modified clutch B (FIG. 3) has a cam 70 which rotates about an axis X and has a cylindrical camming surface 72 that is eccentric to the axis X. The eccentricity, in effect, imparts a lobe to the cylindrical surface 72. The clutch B also has a rotor 74 which rotates about the axis X and contains bores 76 which open into a connecting cavity 78. The bores 76 hold pistons 80 which project outwardly and at their ends bear against the camming surface 72 on the cam 70. The unoccupied regions of the bore 76 together with the connecting cavity 78 form a fluid chamber 82 that contains a magneto-rheological fluid 84. The connecting cavity 78 also contains a coil 86 which is immersed in the rheological fluid 84, and as such controls the viscosity of the fluid 84.

Assuming that the coil 86 is not energized and a load is imparted to the rotor 74, all while a motor rotates the cam 70, the cam 70 will simply rotate around the rotor 74, its camming surface 72 driving the pistons 78 inwardly and outwardly. But when coil 86 is energized, causing the fluid 84 to become more viscous, the fluid 84 resist displacement of the pistons 76 in their bores 78. The pistons 76 in effect grip the camming surface 72 and the rotor 74. The torque so transferred rotates the rotor 74.

Of course, in the clutch A the gear 4 and, along with it, the rotor 22 may be the driving component and the cam 20 and shaft 2 the driven component. The same holds true for the clutch B; the rotor 74 may be the driving component and the cam 70 the driven component. Instead of the coils 24 and 86 controlling the viscosity of the magneto-rheological fluid 28, a series of permanent magnets may do so, such as by varying their distance from the fluid 28. Alternatively, the rheological fluids 28 and 84 in the clutches A and B may be of the type that responds to electrical current conducted through it instead of a magnetic field. Also, the pistons 26 and 80 need not be circular in cross section, but may have other cross-sectional configurations as well. Furthermore, in the clutch A the counterbores 42 may be eliminated, in which only the bores 40 receive the pistons 26, and the pistons 26 may extend all the way into connecting cavity 44 which should be deep enough to accommodate their reciprocation. Moreover, the camming surface need not be around the axis of rotation in the sense that it is presented toward or away from the axis, but instead may lie in a plane or other envelope through which the axis passes, with the axis being oblique to the envelope. In that variation, the pistons move axially.

The invention claimed is:

1. A clutch for transferring torque, said clutch comprising:
   a cam that is capable of rotating about an axis and has a camming surface;
   a rotor that is also capable of rotating about the axis and has piston cavities that open out of it, the rotor further enclosing a fluid chamber;
   pistons located in the piston cavities of the rotor where they are exposed to the fluid chamber, the pistons projecting from the piston cavities toward the camming surface of the rotor, which they contact;
   a rheological fluid in the fluid chamber to project at least one piston farther from the rotor in response to the retraction of the another piston farther into the rotor; and
   activation means for varying the viscosity of the rheological fluid to control slippage between the cam and rotor.

2. A clutch according to claim 1 wherein the cam is configured such that when the pistons are in contact with it, the volume of the fluid chamber remains substantially constant irrespective of the angular position of the cam relative to the rotor.

3. A clutch according to claim 2 wherein the rotor contains a connecting cavity that is in communication with the piston cavities, and the fluid chamber includes the connecting cavity.

4. A clutch according to claim 3 wherein the pistons do not occupy the piston cavities in their entireties, and the fluid chamber also includes the unoccupied regions of the piston cavities.

5. A clutch according to claim 2 wherein the camming surface surrounds the axis and faces away from the axis.

6. A clutch according to claim 2 wherein the activating means is an electrical coil.

7. A clutch according to claim 6 wherein the coil surrounds the rotor.

8. A clutch according to claim 7 wherein the rotor surrounds the cam.

9. A clutch according to claim 2 wherein the cam has multiple lobes along its camming surface, with the lobes being arranged at equal circumferential intervals around the axis, and the pistons are in number at least twice as many as there are lobes on the cam.

10. A clutch according to claim 9 wherein the pistons are arranged at equal circumferential intervals around the axis.

11. A clutch for transferring torque, said clutch comprising:
    a cam which is rotatable about the axis and has a camming surface which surrounds the axis, there being multiple lobes along the camming surface;
    a rotor located around the axis and also being rotatable about the axis, the rotor enclosing a fluid chamber and further having piston cavities which open toward the camming surface on the cam;
    a rheological fluid in the fluid chamber, whereby viscosity of the fluid is variable;
    pistons located in the piston cavities where they are exposed to the rheological fluid in the fluid chamber, the pistons projecting from the piston cavities toward the camming surface of the cam which they contact;
    the configuration of the camming surface on the cam and the location and number of the pistons in the rotor being such that the volume of the fluid chamber remains essentially constant irrespective of the angular position of the cam relative to the rotor, whereby the rheological fluid holds the pistons against the camming surface;
    an electrical device for controlling the viscosity of the rheological fluid and thus controlling the slippage between the cam and rotor.

12. A clutch according to claim 11 wherein the electric device is a coil.

13. A clutch according to claim 12 wherein the coil surrounds the rotor, and the rotor surrounds the cam.

14. A clutch according to claim 12 wherein the pistons are arranged at equal circumferential intervals around the axis and in number are twice as many as there are lobes on the cam.

15. A clutch according to claim 12 wherein the piston cavities are cylindrical.

16. A clutch assembly according to claim 11 wherein the pistons do not occupy the entireties of the piston cavities; wherein the piston cavities open into a connecting cavity within the rotor and are in communication through the connecting cavity; and wherein the connecting cavity together with the regions of the piston cavities not occupied by the pistons form the fluid chamber.

17. A process for transmitting torque between first and second members that are capable of rotation about a common axis, said process comprising:
    providing a camming surface on the first member, with the camming surface having lobes;

providing a second member with piston cavities that open out of the second member toward the camming surface on the first member and also with a fluid chamber to which the piston cavities are exposed;

providing pistons in the piston cavities of the second member, with the pistons extending to and contacting the camming surface on the first member;

providing a rheological fluid that fills the fluid chamber;

applying torque to one of the members; and controlling the viscosity of the rheological fluid to render it viscous enough that the pistons grip the camming surface of the first member sufficiently to enable torque to be transferred between the members.

18. The process according to claim 17 wherein the rheological fluid is sensitive to magnetic fields, with its viscosity being dependent on the strength of a magnetic field in which it lies; and further comprising providing a magnetic field within which the rheological fluid lies and varying the strength of the magnetic filed to render the rheological fluid viscous enough to enable the pistons to transfer torque.

19. The process according to claim 17 wherein the camming surface on the first member has multiple lobes, and the second member surrounds the first member.

* * * * *